(12) United States Patent
Fazio

(10) Patent No.: US 6,443,101 B1
(45) Date of Patent: Sep. 3, 2002

(54) PET APPAREL WITH LEASH

(76) Inventor: Jean M. Fazio, P.O. Box 216, Freedom, NH (US) 03836

( * ) Notice: Subject to any disclaimer, the term of this patent is extended or adjusted under 35 U.S.C. 154(b) by 0 days.

(21) Appl. No.: 09/599,276

(22) Filed: Jun. 22, 2000

(51) Int. Cl.[7] .............................................. A01K 27/00
(52) U.S. Cl. ...................................... 119/792; 119/850
(58) Field of Search .................................. 119/856, 907, 119/792, 793, 795, 857, 865, 858, 850; 280/801; 907/792; 54/79.1

(56) References Cited

U.S. PATENT DOCUMENTS

| | | | |
|---|---|---|---|
| 1,614,083 A | * 1/1927 | Plantico | 119/793 |
| 4,530,309 A | 7/1985 | Collins | |
| 4,559,906 A | 12/1985 | Smith | |
| 4,715,618 A | 12/1987 | Harris | |
| 5,184,762 A | * 2/1993 | Nevitt | 224/148 |
| 5,644,902 A | * 7/1997 | Kemp | 54/37.1 |
| 5,941,199 A | 8/1999 | Tamura | |
| 6,138,611 A | * 10/2000 | Thielemann | 119/850 |

FOREIGN PATENT DOCUMENTS

GB          2237493       * 5/1991   ................. 119/858

* cited by examiner

Primary Examiner—Peter M. Poon
Assistant Examiner—Timothy D. Collins
(74) Attorney, Agent, or Firm—Joseph R. Birkner

(57) ABSTRACT

A pet apparel in combination with a leash and a pocket for storing the leash for an animal such as a dog or a cat is disclosed. The pet apparel comprising a material blank having a central portion, a first arm and a second arm extending horizontally from the central portion and a first leg and a second leg extending angularly from the central portion. A leash having a first end is fixedly attached to the central portion of the material blank. The leash has a second free end on which a loop is formed. A means for removably attaching the material blank to the animal so that the first leg and the second leg completely encircles the neck of the animal and the first arm and the second arm completely encircles the abdomen of the animal between the front legs and the rear legs is provided. The central portion of the material blank disposed on the back of the animal such that the leash is accessible.

20 Claims, 4 Drawing Sheets

PET APPAREL WITH LEASH

FIELD OF THE INVENTION

This invention relates generally to pet apparel. More particularly, the present invention relates to a pet apparel in combination with a leash for an animal such as a dog or a cat.

BACKGROUND OF THE INVENTION

Pet apparel for animals such as dogs and cats are available in the form of sweaters, vests, coats or blankets which, when worn by the animal, keeps it warm while providing protection from the elements. A dog, for example, in addition to a pet apparel, typically has a collar to which a leash is mechanically attached for walking by the dog's master. The leash being separately attachable to the collar with a snap is somewhat inconvenient to use and may be lost or misplaced and is typically not directly an integral part of the pet apparel. Also, snaps can jam or become fouled with dirt making them difficult to connect to the collar particularly by small children, handicapped persons or by those having limited hand or finger mobility.

U.S. Pat. No. 5,941,199 to Tamura, shows a walking jacket for cats with a leash, separately detachably attached thereto (see FIGS. 4 & 5). A problem with the invention is that the leash is not integral with the jacket.

U.S. Pat. No. 4,715,618 to Harris discloses a vehicle safety harness for pets with a fabric jacket with straps and a connector ring 43 for attaching a leash. A problem with the invention is that a separate leash must be used.

U.S. Pat. No. 4,530,309 to Collins discloses an animal support harness with a handle 14 and U.S. Pat. No. 4,559,906 to Smith discloses a small animal harness with straps and hook and latch fasteners and a ring 32 to which a leash may be attached.

None of the above prior art devices disclose a pet apparel with an integral leash fixedly attached thereto nor do they disclose a pocket disposed on the pet apparel for storing the leash when not needed.

In view of the above mentioned problems and limitations associated with conventional pet apparel, animal harness or the like, it was recognized by the present inventor that there is an unfilled need for an improved pet apparel in combination with a leash, instead of a separate leash for use with a collar and a separate pet apparel.

Accordingly, it becomes clear that there is a great need for a pet apparel that has an integral leash for use as a pet apparel which overcomes the disadvantages of the prior art pet apparel. Such a pet apparel should be one that is easy to use, is positively securable to an animal and is economically manufactured.

SUMMARY OF THE INVENTION

It is therefore an object of this invention to provide a pet apparel comprising a material blank with an integral leash, for use as a collarless pet apparel which avoids the aforementioned problems of prior art devices.

It is a further object of this invention to provide a pet apparel with a leash and with a pocket for storing the leash when not needed.

It is a further object of this invention to provide a pet apparel with a leash which may be manufactured from readily available materials by conventional manufacturing processes.

It is still a further object of this invention to provide a pet apparel with a leash that is simple in design, simple to manufacture, low in cost and easy to use.

This invention results from the realization that there is a great need for a pet apparel with an integral leash and with a pocket for storing the leash. The resulting invention provides a user the capability of conveniently being able to walk a dog or a cat without the need to provide a separate leash or collar.

The above and the other objects are achieved in accordance with the present invention, which, according to a first aspect, provides a pet apparel for an animal comprising a material blank having a central portion, a first arm and a second arm extending horizontally from the central portion and a first leg and a second leg extending angularly from the central portion. A leash having a first end is fixedly attached to the central portion of the material blank. The leash has a second free end on which a loop is formed. A means for removably attaching the material blank to the animal so that the first leg and the second leg completely encircles the neck of the animal and the first arm and the second arm completely encircles the abdomen of the animal between the front legs and the rear legs is provided. The central portion of the material blank disposed on the back of the animal such that the leash is accessible.

The second aspect is a special case of the first aspect of this invention with additional features.

According to a second aspect of the invention a pet apparel in combination with a leash for an animal is provided where the means for removably attaching the material blank to the animal is a hook and loop fastener attached to a front face of said material blank on the first arm and on the first leg and to a rear face of the material blank on the second arm and on the second leg so that when the material blank is placed on the animal, the hook and loop fastener is engaged in a mating relationship thereby securely, adjustably, attaching the material blank to the animal.

The third aspect is a special case of the first aspect and second aspects of this invention with additional features.

According to a third aspect of the invention, disclosed is a pet apparel in combination with a leash and a pocket for storing the leash, for an animal. The pocket, having an access opening therein, is disposed on a front face of the material blank on the central portion. The first end of the leash is permanently attached to the central portion of the material blank in close proximity to the access opening in the pocket with a stitch by sewing. The pocket having a flap with a closure disposed on the flap and on the pocket for retainably closing the pocket when the leash is stowed therein.

DETAILED DESCRIPTION OF PREFERRED EMBODIMENTS

Looking more particularly to the drawings, there is shown in FIGS. 1–4 a preferred embodiment of a pet apparel with leash, which is generally indicated at 10, according to a preferred embodiment of the present invention.

Figure 1:
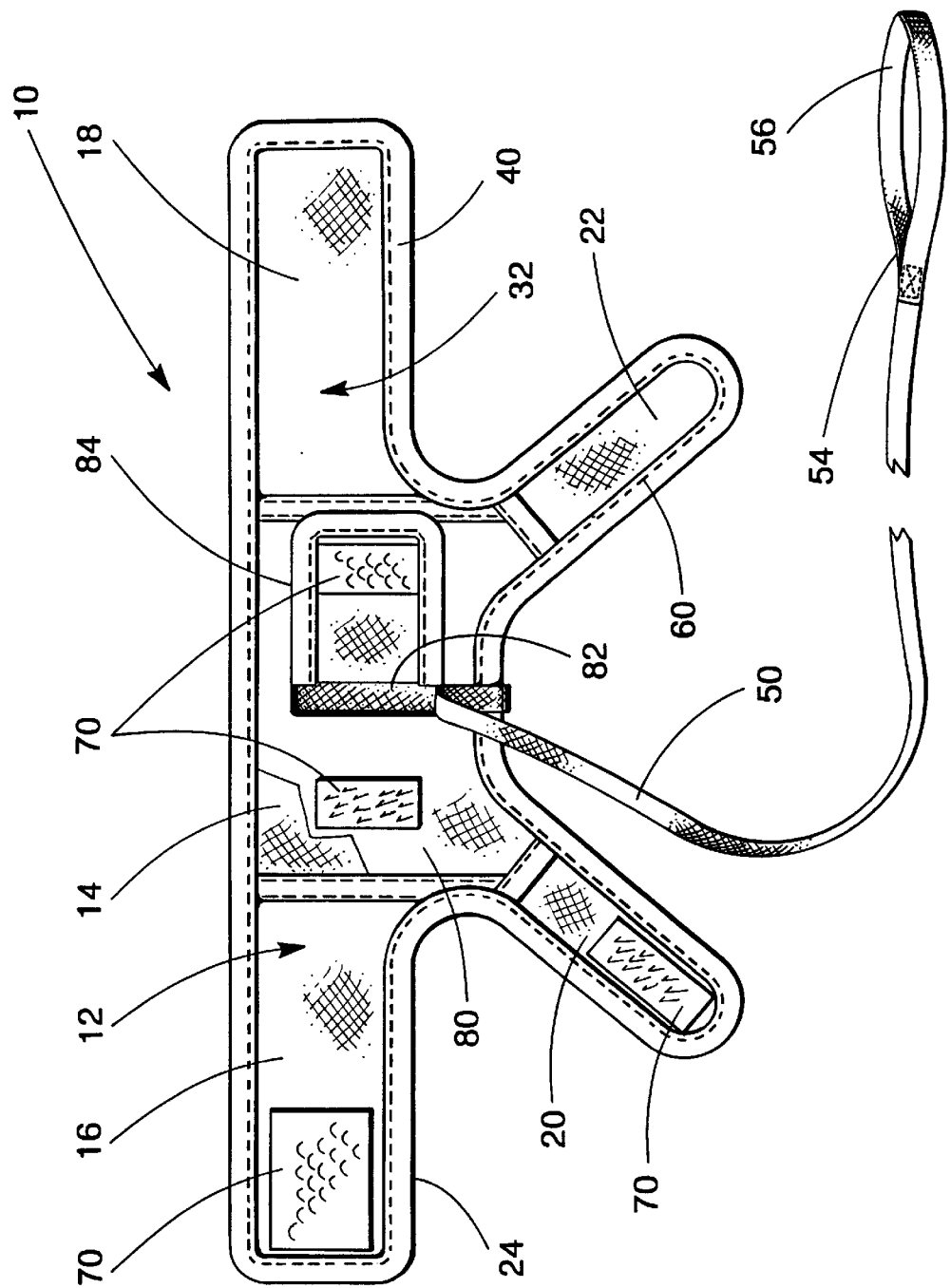
FIG. 1 is a front elevation view of a preferred embodiment of a pet apparel with leash of the instant invention shown with the leash deployed.
Figure 2:
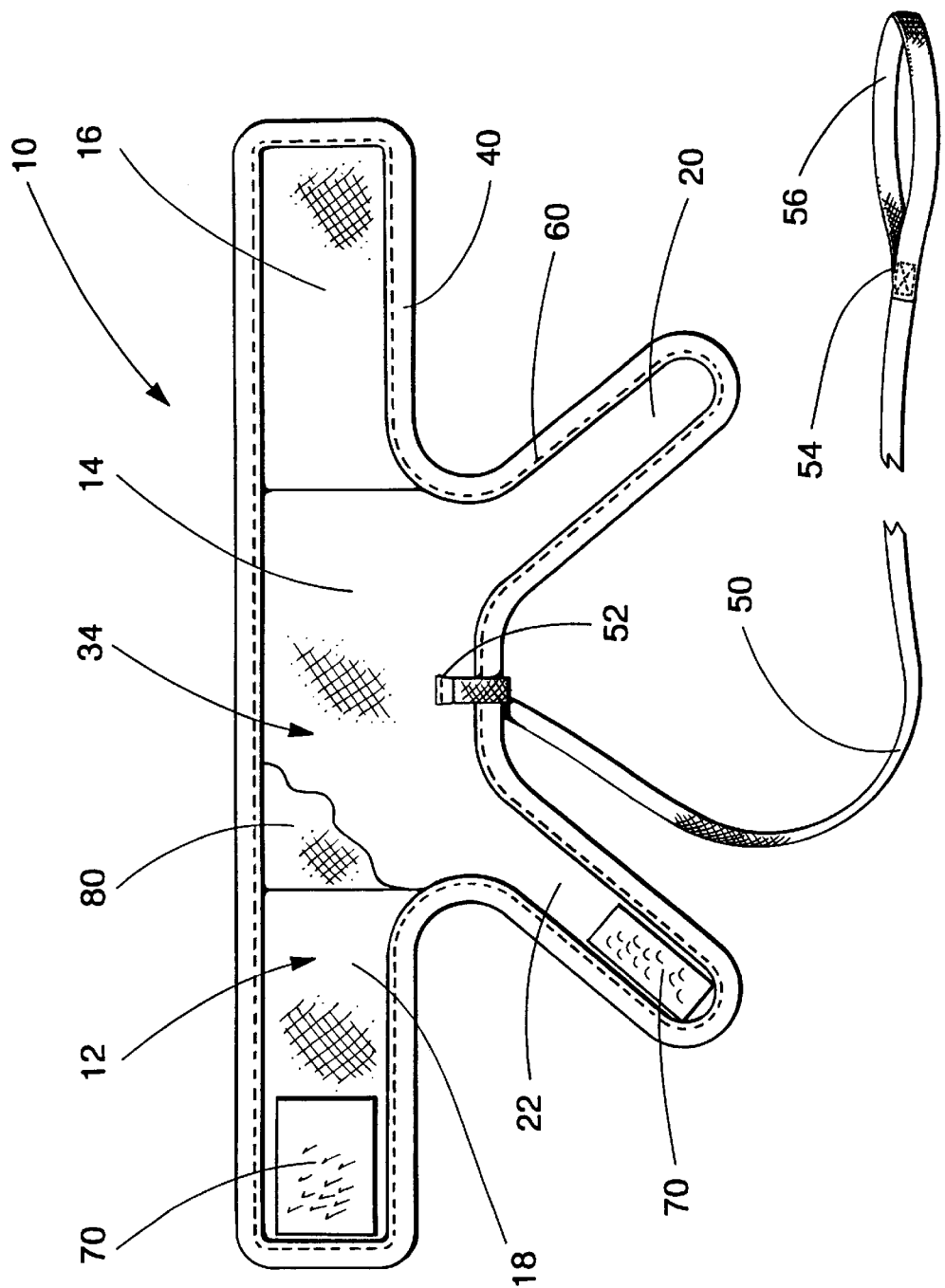
FIG. 2 is a rear elevation view of a preferred embodiment of a pet apparel with leash of the instant invention shown with the leash deployed.

The pet apparel 10 for an animal comprises a material blank 12 having a central portion 14, a first arm 16 and a second arm 18 extending horizontally from the central portion 14 and a first leg 20 and a second leg 22 extending angularly from the central portion 14. A leash 50 having a first end 52 is fixedly attached to the central portion 14 of the material blank 12. The leash 50 has a second free end 54 on which a loop 56 is formed. FIG. 1 is a front elevation view and FIG. 2 is a rear elevation view of a preferred embodiment of the pet apparel 10 of the instant invention which show the leash 50 deployed. A means for removably attaching the material blank 12 to the animal so that the first leg 20 and the second leg 22 completely encircles the neck of the animal and the first arm 16 and the second arm 18 completely encircles the abdomen of the animal between the front legs and the rear legs is provided. The central portion 14 of the material blank 12 disposed on the back of the animal such that the leash 50 is accessible.

A preferred means for removably attaching the material blank 12 to the animal includes a hook and loop fastener 70 attached to a front face 32 of the material blank 12 on the first arm 18 and on the first leg 20 and to a rear face 34 of the material blank 12 on the second arm 18 and on the second leg 22 so that when the material blank 12 is placed on the animal, the hook and loop fastener 70 is engaged in a mating relationship thereby securely, adjustably, attaching the material blank 12 to the animal. It is understood that other attaching means may include a button, a clip, a snap fastener or a buckle attachment without departing from this disclosure.

Figure 3:
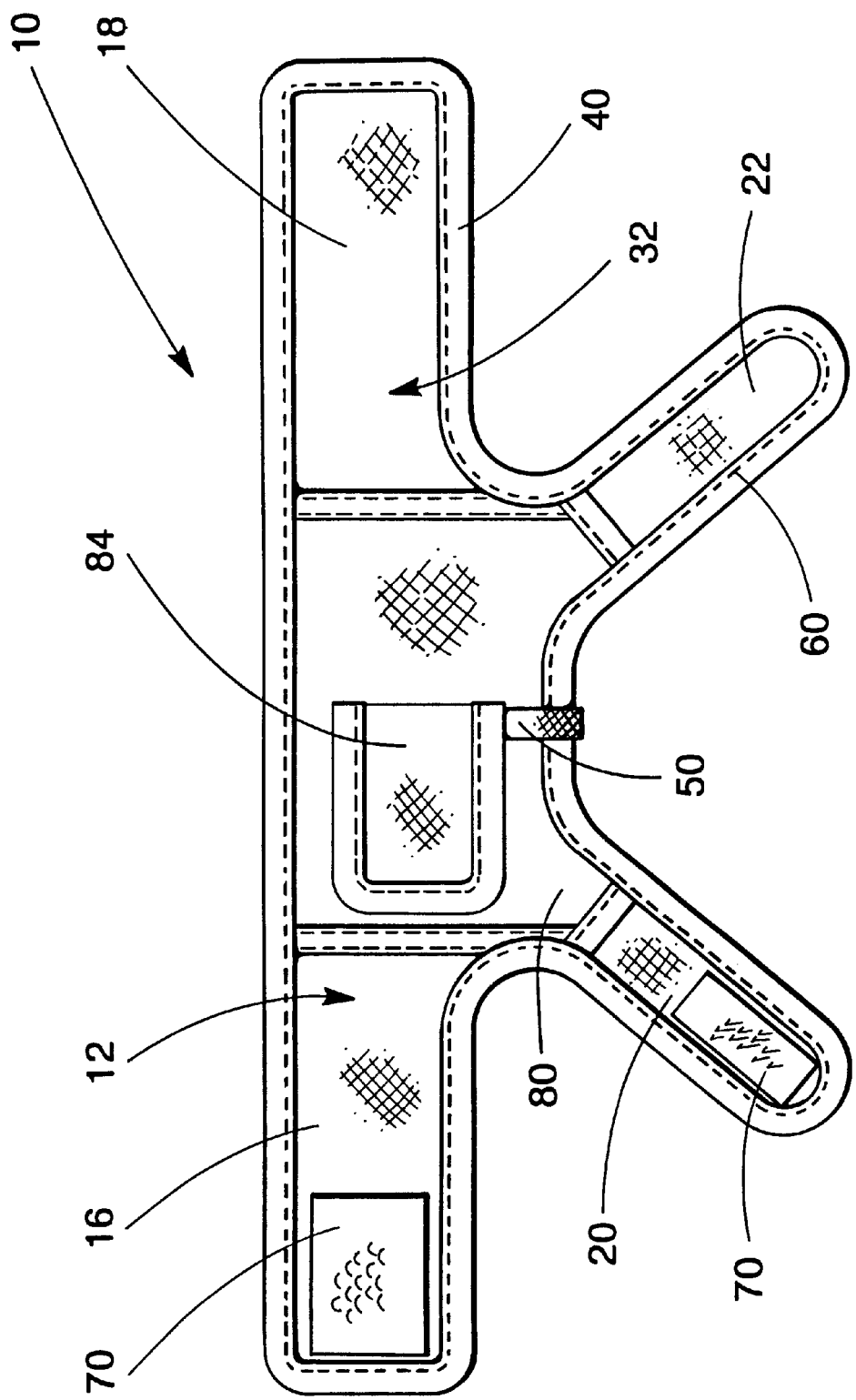
FIG. 3 is a front elevation view of a preferred embodiment of a pet apparel with leash of the instant invention shown with the leash stowed in a pocket; and, FIG. 4 is another front elevation view of a preferred embodiment of the instant invention showing the pet apparel with leash mounted on a dog which is shown in phantom.

FIG. 3 is a front elevation view of a preferred embodiment of the pet apparel 10 with the leash 50 stowed in a pocket 80. Although not necessary for operation, to make the instant invention more useful, the pet apparel 10 may include the pocket 80 with an access opening 82 therein, for storing the leash 50. The pocket 80 may have further use for storing animal treats or the master's personal items such as a wallet, keys or a change purse. The pocket 80 is disposed on the front face 32 of the material blank 12 on the central portion 14 and is sized to accommodate the leash 50. Preferably, the pocket 80 is completely disposed on the central portion 14 so that the leash 50 may be readily contained therein. The pocket 80 preferably has a flap 84 for closing the access opening 82 when the leash 50 is stowed in the pocket 80. Although not needed, a closure, preferably such as the hook and loop fastener 70 disposed on the flap 84 and on the pocket 80 as shown in FIG. 1 may be provided for convenience. It is understood that other closures may be used such as a button, a zipper or a snap fastener.

It is understood that the first end 52 of the leash 50 may be permanently attached to the central portion 14 with a stitch 60 by sewing. When the pet apparel 10 has a pocket 80, the first end 52 of the leash 50 may preferably be permanently attached to the central portion 14 of the material blank 12 in close proximity to the access opening 82 in the pocket 80 with a stitch 60 by sewing.

Preferably, a binding 40 is disposed about a perimeter edge 24 of the material blank 12 and secured thereto with the stitch 60 by sewing to reinforce the material blank 12. The pocket 80 also is secured to the central portion 14 with the binding 40 with the stitch 60 by sewing.

The pet apparel 10 may be fabricated from readily available natural or synthetic materials by conventional fabrication techniques such as by sewing. For example, the material blank 12, the leash 50 and the binding 40 may be made from a material selected from the group consisting of wool, cotton, flannel, leather, nylon and vinyl.

Figure 4:
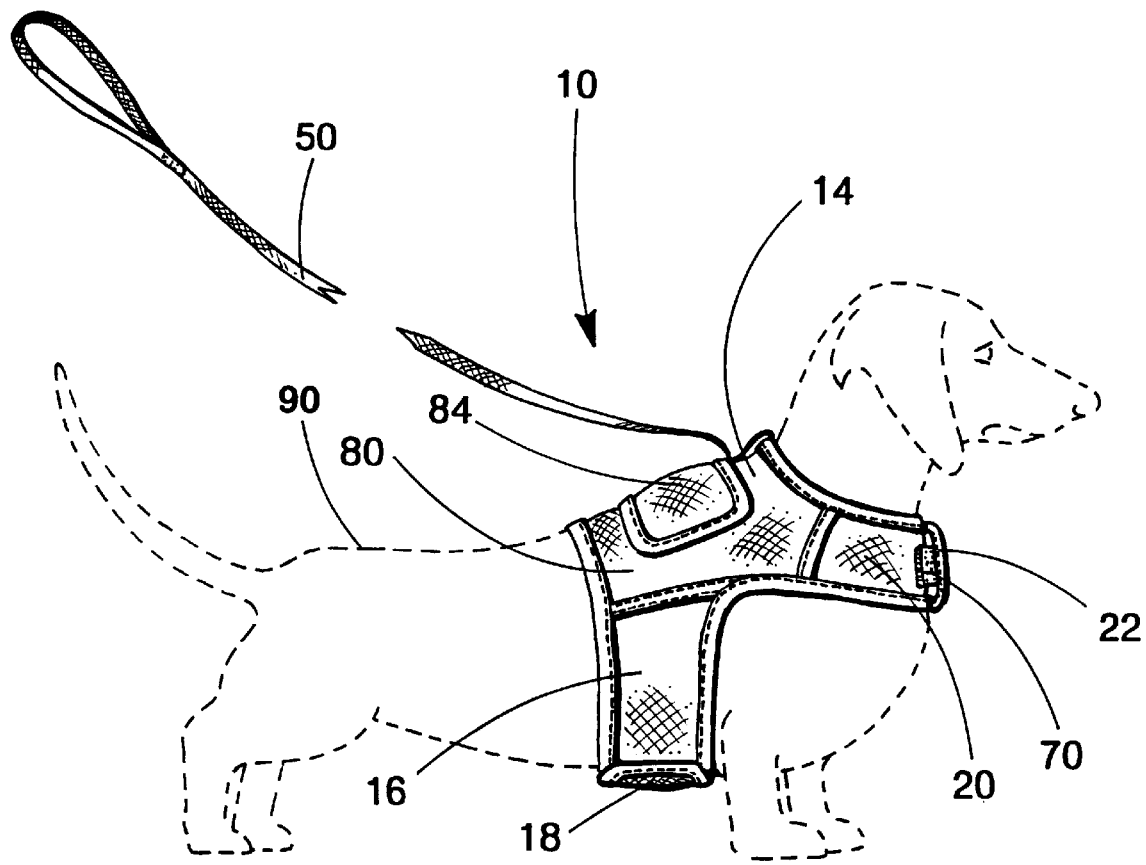

To use the pet apparel 10, a user simply places it on the body of an animal, such as a dog 90 shown in phantom in FIG. 4, and secures it thereto using the attaching means in a manner described above. The leash 50, being an integral part of the pet apparel 10 is readily accessible by the user for walking the animal.

Surprisingly, the instant invention provides an added advantage and recognizes a problem and adequately and completely addresses an unfulfilled need, in that a leash combined with a pet apparel 10, in the manner disclosed, in effect, defines a collarless pet apparel by eliminating the need to provide a separate collar, a leash and apparel for an animal.

The pet apparel 10 may be constructed in a wide variety of sizes and style variations to fit various animals such as dogs and cats. For example, the first arm 16 and the second arm 18 of the pet apparel 10 may each being greater in width than the width of each the first leg 20 and the second leg 22 of the pet apparel 10, so that the pet apparel 10 may be readily fitted to a dachshund. It is understood that the pet apparel 10 may also have artistic decorations thereon without departing from the scope of this disclosure.

One practical advantage of the invention is that it provides a convenient, practical, low cost, pet apparel 10 which allows a user to conveniently walk a dog or cat without the need to provide a separate leash or collar while also providing a convenient pocket for storing the leash.

A further advantage of the invention is that the pet apparel 10 is designed for ease of manufacture by standard methods and by using readily available materials.

Of course, a wide variety of further uses and advantages of the present invention will become apparent to one skilled in the art.

As disclosed, it is apparent that the instant invention can provide other covering, fastening and decorative options for animals for use such as vests, sweaters and coats. One skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A pet apparel for an animal comprising:
   a material blank for covering the animal and for providing warmth and protection from the elements to the animal in combination with a leash for leading the animal;
   said material blank, generally table like in shape for ergonomically fitting about the animal and having formed thereon from a single piece of material, a central portion, a first arm, a second arm, a first leg and a second leg each fixed to said central portion and said first arm and said second arm linearly disposed about said central portion and said second arm oriented opposite to said first arm, said first leg angularly disposed adjacent to said central portion, below and in close proximity to said first arm and said second leg angularly disposed adjacent to said central portion, below and in close proximity to said second arm and oriented opposite to said first leg and said first leg and said second leg each extending from said central portion together generally defining a vee shape and said arms and said legs self supporting and having free ends spaced apart from each other by said central portion for fitting about the animal when joined together without lifting the animal;

said leash, having a non adjustable fixed length, a first end fixedly and permanently attached to said central portion of said material blank about midway between said first leg and said second leg and a second free end on which a loop, is permanently, non adjustably formed directly from said leash; and means for removably attaching said material blank and said leash combination to the animal wherein said attaching means fixedly disposed on a front face of said material blank on said first arm and on said first leg and to a rear face of said material blank on said second arm and on said second leg so that when said material blank is placed on the animal, and when cooperatively engaged by said attaching means, said first leg and said second leg completely encircles the neck of the animal, said first arm and said second arm completely encircles the abdomen of the animal between the front legs and the rear legs and said central portion disposed on the back of the animal so that said leash, as placed, is accessible from the back of the animal and said material blank is securely, adjustably, attached to the animal.

2. The pet apparel of claim 1 wherein said means for removably attaching said material blank and said leash combination to the animal includes a hook and loop fastener attached to said front face of said material blank on said first am and on said first leg and to said rear face of said material blank on said second arm and on said second leg so that when said material blank is placed on the animal, said hook and loop fastener is engaged in a mating relationship thereby securely, adjustably, attaching said material blank to the animal.

3. The pet apparel of claim 2 further comprising a pocket with an access opening therein for storing said leash, said pocket formed within said material blank and disposed on said front face of said material blank on said central portion.

4. The pet apparel of claim 3 wherein said first end of said leash permanently attached to said central portion of said material blank in close proximity to the access opening in said pocket with a stitch by sewing.

5. The pet apparel of claim 4 further comprising a binding disposed about a perimeter edge of said material blank and secured thereto with said stitch by sewing.

6. The pet apparel of claim 5 wherein said pocket is secured to said central portion with said binding with said stitch by sewing.

7. The pet apparel of claim 6 wherein said pocket has a flap for closing the access opening in said pocket when said leash is stowed therein said pocket.

8. The pet apparel of claim 7 wherein said flap of said pocket further includes a closure such as said hook and loop fastener disposed on said flap and on said pocket.

9. The pet apparel of claim 8 wherein said pocket is completely disposed on said central portion.

10. The pet apparel of claim 9 wherein said material blank, said leash and said binding are made from a material selected from the group consisting of wool, cotton, flannel, leather, nylon and vinyl.

11. A pet apparel in combination with a leash for an animal, said pet apparel comprising:

a material blank for covering the animal and for providing warmth and protection from the elements to the animal in combination with a leash for leading the animal;

said material blank, generally table like in shape for ergonomically fitting about the animal and having formed thereon from a single piece of material, a central portion, a first arm, a second arm, a first leg and a second leg each fixed to said central portion and said first arm and said second arm linearly disposed about said central portion and said second arm oriented opposite to said first arm, said first leg angularly disposed adjacent to said central portion, below and in close proximity to said first arm and said second leg angularly disposed adjacent to said central portion, below and in close proximity to said second arm and oriented opposite to said first leg and said first leg and said second leg each extending from said central portion together generally defining a vee shape and said arms and said legs self supporting and having free ends spaced apart from each other by said central portion for fitting about the animal when joined together without lifting the animal;

said leash, having a non adjustable fixed length, a first end fixedly and permanently attached to said central portion of said material blank about midway between said first leg and said second leg and a second free end, on which a loop, is permanently, non adjustably formed directly from said leash; and a hook and loop fastener, for removably attaching said material blank and said leash combination to the animal, fixedly attached to a front face of said material blank on said first arm and on said first leg and to a rear face of said material blank on said second arm and on said second leg so that when said material blank is placed on the animal, said hook and loop fastener is engaged in a mating relationship thereby securely, adjustably, attaching said material blank to the animal and so that said first leg and said second leg completely encircles the neck of the animal, said first arm and said second arm completely encircles the abdomen of the animal between the front legs and the rear legs and said central portion of said material blank disposed on the back of the animal such that said leash is accessible from the back of the animal and said material blank is securely, adjustably, attached to the animal.

12. The pet apparel of claim 11 further comprising a pocket with an access opening therein, for storing said leash, said pocket formed within said material blank and disposed on said front face of said material blank on said central portion.

13. The pet apparel of claim 12 wherein said first end of said leash permanently attached to said central portion of said material blank in close proximity to the access opening in said pocket with a stitch by sewing.

14. The pet apparel of claim 13 further comprising a binding disposed about a perimeter edge of said material blank and secured thereto with said stitch by sewing.

15. The pet apparel of claim 14 wherein said pocket is secured to said central portion with said binding with said stitch by sewing.

16. The pet apparel of claim 15 wherein said pocket has a flap for closing the access opening in said pocket when said leash is stowed therein said pocket and said flap further includes a closure such as said hook and loop fastener disposed on said flap and on said pocket.

17. The pet apparel of claim 16 wherein said pocket is completely disposed on said central portion.

18. The pet apparel of claim 17 wherein said material blank, said leash and said binding are made from a material selected from the group consisting of wool, cotton, flannel, leather, nylon and vinyl.

19. The pet apparel of claim 18 wherein said first arm and said second arm each being greater in width than the width of each said first leg and said second leg for ease of fitting about the animal without interference.

20. A pet apparel in combination with a leash and a pocket for storing said leash, for an animal, said pet apparel comprising;

a material blank for covering the animal and for providing warmth and protection from the elements to the animal in combination with a leash for leading the animal;

said material blank, generally table like in shape for ergonomically fitting about the animal and having formed thereon from a single piece of material, a central portion, a first arm, a second arm, a first leg and a second leg each fixed to said central portion and said first arm and said second am linearly disposed about said central portion and said second arm oriented opposite to said first arm, said first leg angularly disposed adjacent to said central portion, below and in close proximity to said first arm and said second leg angularly disposed adjacent to said central portion, below and in dose proximity to said second arm and oriented opposite to said first l and said first leg and said second leg each extending from said central portion together generally defining a vee shape and said arms and said legs self supporting and having free ends spaced apart from each other by said central portion for fitting about the animal when joined together without lifting the animal;

said leash having a non adjustable fixed length, a first end fixedly and permanently attached to said central portion of said material blank about midway between said first leg and said second leg and a second free end, on which a loop, is permanently, non adjustably formed directly from said leash;

said pocket, having an access opening therein, for storing said leash, said pocket formed within said material blank and disposed on a front face of said material blank on said central portion with a binding and a stitch;

said first end of said leash permanently attached to said central portion of said material blank in close proximity to the access opening in said pocket with said stitch by sewing;

said pocket having a flap with a closure disposed on said flap and on said pocket for retainably closing said pocket when said leash is stowed therein; and a hook and loop fastener, for removably attaching said material blank and said leash combination to the animal, fixedly attached to a front face of said material blank on said first arm and on said first leg and to a rear face of said material blank on said second arm and on said second leg so that when said material blank is placed on the animal, said hook and loop fastener is engaged in a mating relationship thereby securely, adjustably, attaching said material blank to the animal and so that said first leg and said second leg completely encircles the neck of the animal, said first arm and said second arm completely encircles the abdomen of the animal between the front legs and the rear legs and said central portion of said material blank disposed on the back of the animal such that said leash is accessible from the back of the animal and said material blank is securely, adjustably, attached to the animal.

* * * * *